United States Patent [19]
Haggard et al.

[11] Patent Number: 6,148,335
[45] Date of Patent: Nov. 14, 2000

[54] PERFORMANCE/CAPACITY MANAGEMENT FRAMEWORK OVER MANY SERVERS

[75] Inventors: Neal A. Haggard, Cary; Chris L. Molloy; Gary M. Quesenberry, both of Raleigh; Robert C. Robinson, Durham; Henry L. Stuck, Chapel Hill, all of N.C.

[73] Assignee: International Business Machines Corporation, Armonk, N.Y.

[21] Appl. No.: 08/978,315

[22] Filed: Nov. 25, 1997

[51] Int. Cl.[7] .................................................. G06F 13/00
[52] U.S. Cl. ............................................................ 709/224
[58] Field of Search ................................. 709/204, 233, 709/223, 224, 227

[56] References Cited

U.S. PATENT DOCUMENTS

| | | | |
|---|---|---|---|
| 5,434,971 | 7/1995 | Lysakowski, Jr. | 395/200 |
| 5,440,744 | 8/1995 | Jacobson et al. | 395/650 |
| 5,446,575 | 8/1995 | Lysakowski, Jr. | 395/200.01 |
| 5,455,948 | 10/1995 | Poole et al. | 395/650 |
| 5,459,837 | 10/1995 | Caccavale | 395/184.01 |
| 5,463,775 | 10/1995 | DeWitt et al. | 395/184.01 |
| 5,475,844 | 12/1995 | Shiramizu et al. | 709/104 |
| 5,495,607 | 2/1996 | Pisello et al. | 395/600 |
| 5,522,070 | 5/1996 | Sumimoto | 395/650 |
| 5,537,542 | 7/1996 | Eilert et al. | 395/184.01 |
| 5,539,659 | 7/1996 | McKee et al. | 364/514 B |
| 5,557,748 | 9/1996 | Norris | 395/200.1 |
| 5,559,726 | 9/1996 | Berry | 702/181 |
| 5,566,069 | 10/1996 | Clark, Jr. et al. | 364/420 |
| 5,568,605 | 10/1996 | Clouston et al. | 714/4 |
| 5,586,252 | 12/1996 | Barnard et al. | 395/185.01 |
| 5,590,360 | 12/1996 | Edwards | 395/800 |
| 5,611,049 | 3/1997 | Pitts | 395/200.09 |
| 5,619,656 | 4/1997 | Graf | 395/200.11 |
| 5,625,816 | 4/1997 | Burdick et al. | 395/614 |
| 5,793,753 | 8/1998 | Hershey et al. | 370/252 |
| 5,819,028 | 10/1998 | Manghirmalani et al. | 709/224 |
| 5,822,401 | 10/1998 | Cave et al. | 379/34 |
| 5,822,532 | 10/1998 | Ikeda | 709/224 |
| 5,825,858 | 10/1998 | Shaffer et al. | 379/120 |
| 5,872,911 | 2/1999 | Berg | 714/43 |

OTHER PUBLICATIONS

"Network Expo—US Launch of SysLoad for Netware", Newsbytes, PNEW02160036, Feb. 16, 1996.

"Server Management", Network VAR, V5, N4, P60 (2), Apr. 1997.

IBM Technical Disclosure Bulletin, "Statistics Gathering and Analyzing Tool for Open Software Foundation's Distributed Computing Environment," vol. 37, No. 02B, Feb. 1994.

IBM Technical Disclosure Bulletin, "Dynamic Load Sharing for Distrubuted Computing Environment," vol. 38, No. 07, Jul. 1995.

*Primary Examiner*—Moustafa M. Meky
*Attorney, Agent, or Firm*—John J. Timar

[57] ABSTRACT

A method of monitoring a computer network by collecting resource data from a plurality of network nodes, analyzing the resource data to generate historical performance data, and reporting the historical performance data to another network node. The network nodes can be servers operating on different platforms, and resource data is gathered using separate programs having different application programming interfaces for the respective platforms. The analysis can generate daily, weekly, and monthly historical performance data, based on a variety of resources including CPU utilization, memory availability, I/O usage, and permanent storage capacity. The report may be constructed using a plurality of documents related by hypertext links. The hypertext links can be color-coded in response to at least one performance parameter in the historical performance data surpassing an associated threshold. An action list can also be created in response to such an event.

20 Claims, 10 Drawing Sheets

PCCO PartnerInfo
OS/2 Reports

*— 122*

| | | | |
|---|---|---|---|
| CPU/Memory/Disk Utilization | Daily | Weekly | Monthly |
| Warnings Only | Daily | Weekly | Monthly |
| Data Availability | Daily | | |

Machine Listing

Red Action List — *126*

Performance/Capacity Contacts
Primary: Rob Hall/Raleigh  Backup: Robert Robinson/Raleigh

}— *120*

[SRM Reports | PCCO Reports | SRM Info | SRM Search | What's New | Feedback]
[IBM External | IBM Internal | Order | Search | Contact IBM | Help | (C) | (TM)]

FIG. 6A

Available CPU/Storage/IO Wait Utilization Monthly View for d04nhs02 in NCO-South

| Month Ending | Status | Node | Days | Obs | CPU Util | Sys % | User % | IO Wait | Run Queue | AVM | FRE | CPU> 85% | CPU> 90% | Run Q> Limit | STOR> 85% | STOR> 90% | Page > 5/sec |
|---|---|---|---|---|---|---|---|---|---|---|---|---|---|---|---|---|---|
| 04/30/1997 | ⊗ | d04nhs02 | 20 | 9488 | 64.4% | 14.0% | 50.4% | 7.4% | 1.8 | 46420 | 1346 | 31.8% | 29.3% | 12.1% | 94.2% | 91.4% | 0.0% |
| 05/31/1997 | ⊗ | d04nhs02 | 22 | 11625 | 68.7% | 19.9% | 48.8% | 9.2% | 1.9 | 46522 | 1369 | 20.5% | 13.6% | 11.9% | 94.6% | 93.1% | 0.0% |
| 06/30/1997 | ⊗ | d04nhs02 | 29 | 15320 | 69.2% | 20.5% | 48.6% | 8.5% | 2.1 | 53029 | 561 | 36.0% | 24.1% | 24.8% | 98.3% | 97.9% | 0.0% |
| 07/31/1997 | ⊗ | d04nhs02 | 31 | 15985 | 60.5% | 11.6% | 48.8% | 10.9% | 1.7 | 55713 | 818 | 29.3% | 18.3% | 30.1% | 98.2% | 97.8% | 0.0% |
| 08/31/1997 | ⊗ | d04nhs02 | 30 | 15970 | 70.2% | 7.5% | 62.7% | 10.3% | 3.1 | 57800 | 836 | 50.8% | 41.2% | 49.3% | 97.4% | 97.0% | 0.0% |
| 09/30/1997 | ⊗ | d04nhs02 | 30 | 15516 | 68.6% | 9.2% | 59.4% | 10.0% | 3.6 | 59900 | 1133 | 46.1% | 32.2% | 40.0% | 97.2% | 96.9% | 0.0% |
| 10/31/1997 | ⊗ | d04nhs02 | 29 | 15591 | 62.8% | 14.2% | 48.6% | 17.2% | 4.4 | 79074 | 2748 | 12.9% | 5.9% | 33.4% | 93.0% | 90.5% | 0.0% |
| 11/30/1997 | ⊗ | d04nhs02 | 9 | 5285 | 75.6% | 10.8% | 64.8% | 15.4% | 6.4 | 89978 | 1981 | 33.2% | 16.3% | 56.3% | 96.2% | 93.9% | 0.0% |

[SRM Reports | NCO Reports | SRM Info | SRM Search | What's New | Feedback]
[IBM External | IBM Internal | Order Search | Contact IBM | Help | (C) | (TM) ]

FIG. 6B

Previous - 1997.10.31

Warnings for OS2_M

OS/2 Performance Report

Monthly report for November 1997 as of Wednesday, Nov 19, 1997

Company=IBM_GS-RTPD Shift=All

| Status | Server | Days | Obs | CPU % | Memory % | Disk % | Lan Response Average | Print Queue Average |
|---|---|---|---|---|---|---|---|---|
| ⊗ | D04DAAT1 | 18 | 25312 | 3.0 | 196.1 | 21.1 | | |
| ⊗ | D04DBS01 | 18 | 25418 | 10.9 | 157.4 | 72.3 | 0.0 | 0.0 |
| ⊗ | D04EGW01 | 18 | 25348 | 17.4 | 133.9 | 86.2 | | |

(CONTINUED)

OS/2 Performance Report

Monthly report for November 1997 as of Wednesday, Nov 19, 1997

FIG. 7

OS/2 Red Action List        FIG. 8

PCCO-PartnerInfo

| Sub-Account | Server | Two Month Trend | | Action | Owner | Target |
|---|---|---|---|---|---|---|
| | | Aug 1997 | Sep 1997 | | | |
| | D04NAI15 | 281.5% Memory | 294.9% Memory | Robert will find IGS contact, and consult with them | Robert Robinson/Raleigh | EOM |
| | D04NHI09 | 167.4% Memory | 173.8% Memory | Robert will find IGS contact, and consult with them | Robert Robinson/Raleigh | EOM (September) |
| | RTPNDI09 | 187.2% Memory | 162.8% Memory | Robert will find IGS contact, and consult with them | Robert Robinson/Raleigh | EOM |
| | D04NHI05 | 155.4% Memory | | Robert will find IGS contact, and consult with them | Robert Robinson/Raleigh | EOM (September) |
| | RTPNDI12 | 85.6% Disk | | customer has cleaned up DASD as of 09/26/97 DASD is at 75% Server Trend Improved | Robert Robinson/Raleigh | EOM |
| | RTPNXC01 | 8.8% Disk | | Robert will find IGS contact, and consult with them. Vicki will contact PCCO about DASD. Robert sent note to Cory Weier making the recommendation to add dasd to this server Server Trend Improved | Robert Robinson/Raleigh | EOM |
| | RTPNXC05 | 152.1% | | Robert will find IGS contact, and consult with them. Server Trend Improved | Robert Robinson/Raleigh | EOM |

FIG. 9

PERFORMANCE/CAPACITY MANAGEMENT FRAMEWORK OVER MANY SERVERS

BACKGROUND OF THE INVENTION

1. Field of the Invention

The present invention generally relates to computer systems, and more particularly to a method of monitoring a plurality of servers (and server processes) in a client-server network. The present invention is adapted for use with the Internet's World Wide Web, but it is generally applicable to the management of any set or class of computers which provide processing or information services to another class of computers.

2. Description of Related Art

Figure 1:
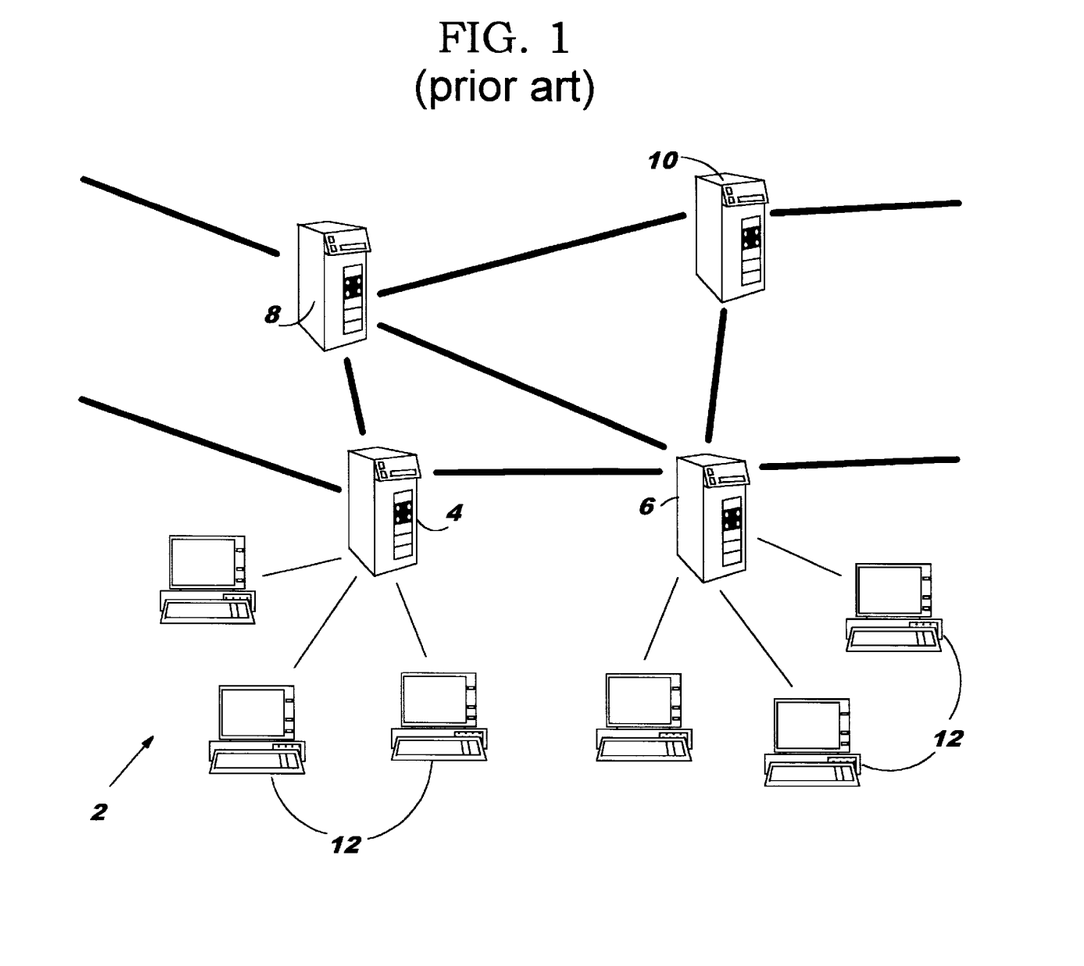
FIG. 1 is a diagram of a conventional computer network, including interconnected servers and workstation clients.

A generalized client-server computing network 2 is shown in FIG. 1. Network 2 has several servers 4, 6, 8 and 10 which are interconnected, either directly to each other or indirectly through one of the other servers. Each server is essentially a stand-alone computer system (having one or more processors, memory devices, and communications devices), but has been adapted (programmed) for one primary purpose, that of providing information to individual users at workstation clients 12. A client is a member of a class or group of computers or computer systems that uses the services of another class or group to which it is not related. Clients 12 can also be stand-alone computer systems (like personal computers, or PCs), or "dumber" systems adapted for limited use with network 2 (like network computers, or NCs). As used herein, "client" generally refers to any multi-purpose or limited-purpose computer adapted for use by a single individual, regardless of the manufacturer, hardware platform, operating system, etc. A single, physical computer can act as both a server and a client (by allocating processing time between client and server processes), although this implementation occurs infrequently.

The information provided by a server can be in the form of programs which run locally on a given client 12, or in the form of data such as files used by other programs. Users can also communicate with each other in real-time as well as by delayed file delivery, i.e., users connected to the same server can all communicate with each other without the need for the network 2, and users at different servers, such as servers 4 and 6, can communicate with each other via network 2. The network can be local in nature, or can be further connected to other systems (not shown) as indicated with servers 8 and 10.

The construction of network 2 is also generally applicable to the Internet. Conventional protocols and services have been established for the Internet which allow the transfer of various types of information, including electronic mail, simple file transfers via FTP, remote computing via TELNET, gopher searching, Usenet newsgroups, and hypertext file delivery and multimedia streaming via the World Wide Web (WWW). A given server can be dedicated to performing one of these operations, or running multiple services. Internet services are typically accessed by specifying a unique address, or universal resource locator (URL). The URL has two basic components, the protocol to be used, and the object pathname. For example, the URL "http://www.uspto.gov" (home page for the U.S. Patent & Trademark Office) specifies a hypertext transfer protocol ("http") and a pathname of the server ("www.uspto.gov"). The server name is associated with a unique numeric value (a TCP/IP address, or "domain").

The present invention relates to the monitoring of server performance in a network like the Internet. System administrators, as well as information technology (IT) executives, generally like to know the productivity of their systems, and want to accurately forecast future needs for upgrading or expanding existing systems. Capital expenditures must be budgeted according to changes in server resource requirements, based on key server operating parameters such as CPU utilization, memory availability, I/O usage, and permanent storage (disk) capacity. This objective has become very difficult to achieve, due to extremely complex environments of hundreds or thousands of networked servers running on many different platforms, including UNIX and its variations (such as AIX, HP-UX, System V, and Mach), Windows NT, OS/2, NetWare, etc. (UNIX is a trademark of UNIX System Laboratories; AIX is a trademark of International Business Machines Corp (IBM); HP-UX is a trademark of Hewlett-Packard Co.; System V is a trademark of American Telephone & Telegraph Co.; Mach is a trademark of NeXT Computers; Windows NT is a trademark of Microsoft Corp.; OS/2 is a trademark of IBM; and NetWare is a trademark of Novell Corp.). In addition to these platforms, some servers are managed by specialized systems, such as SAP (a suite of bundled business software including an accounts receivable program, a materials management program, a scheduling program, etc.).

Asset and availability management services such as those offered by SAP (a trademark of SAP A.G.) or Peoplesoft (a trademark of Peoplesoft Corp.) provide some access to key data, e.g., sales orders, but there is no conventional method for determining how associated system processes are performing. It would, therefore, be desirable to devise a method of monitoring server resources which allowed an administrator to accurately determine usage and capacity across all of the servers in a network. It would be further advantageous if the method were easily extended as IT expectations increase.

SUMMARY OF THE INVENTION

It is therefore one object of the present invention to provide an improved method of monitoring network resources, particularly server resources in a client-server network.

It is another object of the present invention to provide such a method that is adapted for use with the Internet, and can be implemented in associated communications software or web browsers.

It is yet another object of the present invention to provide such a method that presents historical performance data for a plurality of servers running on different platforms or systems.

The foregoing objects are achieved in a method of monitoring a computer network, generally comprising the steps of collecting resource data from a plurality of network nodes, analyzing the resource data to generate historical performance data, and reporting the historical performance data to another network node. In one implementation, the plurality of network nodes are servers operating on different platforms, and the collecting step includes the step of gathering resource data using separate programs having different application programming interfaces for the respective platforms. The analyzing step can generate daily, weekly, and monthly historical performance data, based on a variety of resources including CPU utilization, memory availability, I/O usage, and permanent storage capacity. The report may be constructed using a plurality of documents related by hypertext links. The hypertext links can be color-coded in response to at least one performance parameter in the historical performance data surpassing an associated threshold. An action list can also be created in response to at least one performance parameter in the historical performance data surpassing an associated threshold.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

The present invention is directed to a method of monitoring server performance in a computer network, such as the network of FIG. 1, and particularly to a method and computer program product for managing server capacity among a plurality of Internet servers. The invention may, however, be implemented in other networks besides the Internet. Therefore, while the present invention may be understood with reference to FIG. 1, this reference should not be construed in a limiting sense.

Figure 2:
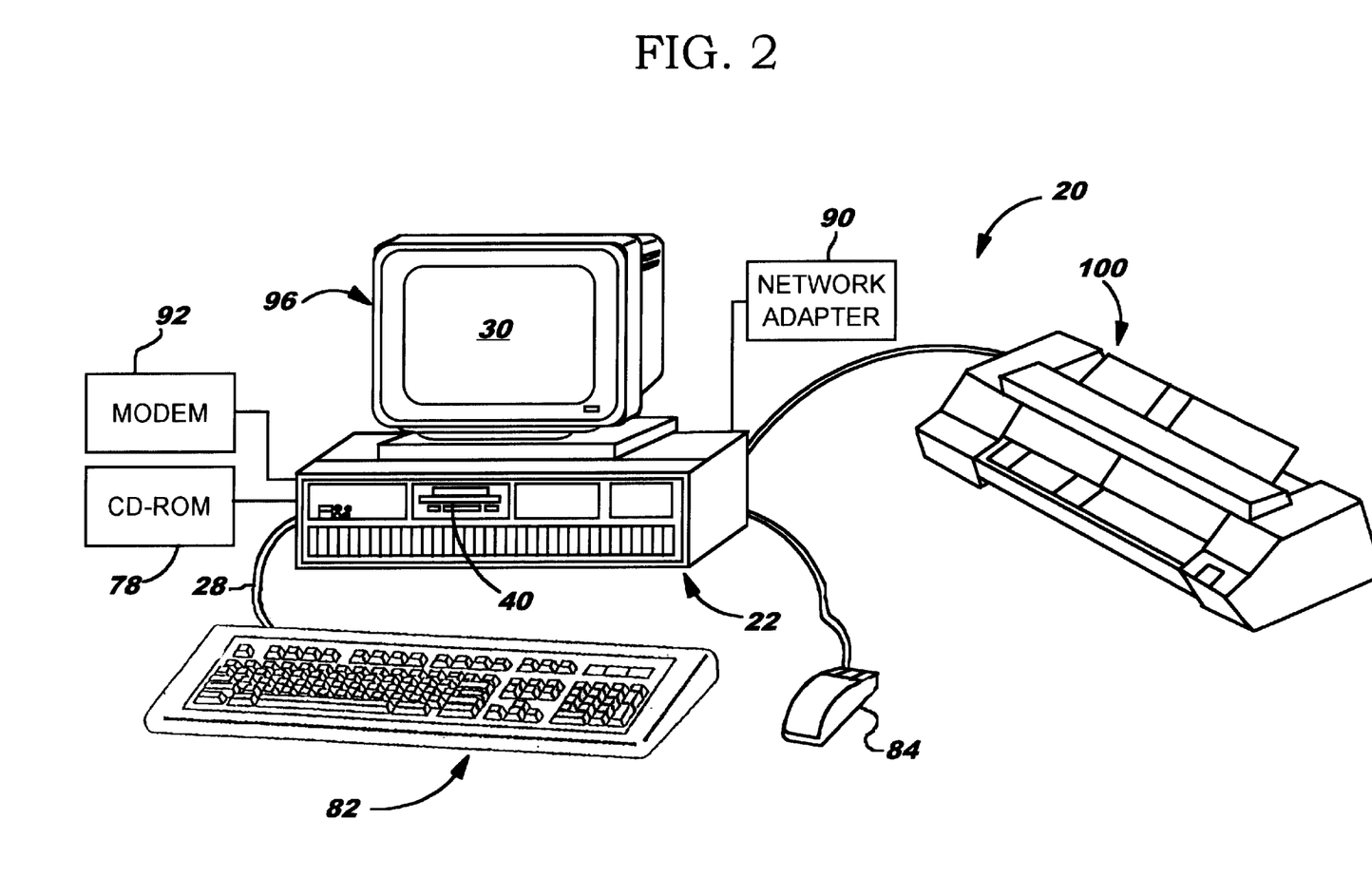
FIG. 2 is an illustration of one embodiment of a data processing system in which the present invention can be practiced.

With further reference to FIG. 2, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

It should be noted and recognized by those persons of ordinary skill in the art that display 96, keyboard 82, and pointing device 84 may each be constructed using any one of several known off-the-shelf components.

Figure 3:
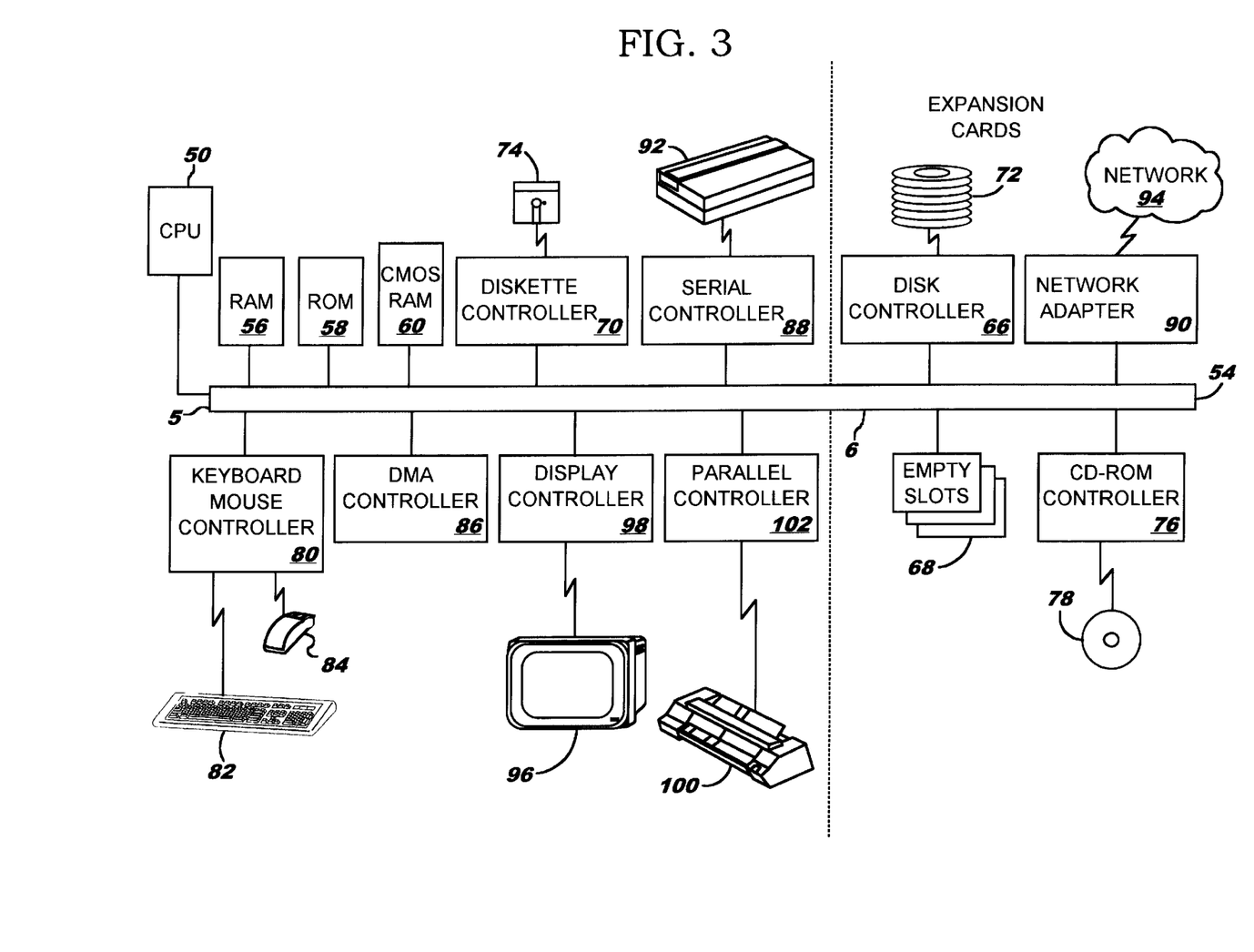
FIG. 3 is a high-level block diagram illustrating selected components that can be included in the data processing system of FIG. 2 according to the teachings of the present invention.

Reference now being made to FIG. 3, a high level block diagram is shown illustrating selected components that can be included in the data processing system 20 of FIG. 2 according to the teachings of the present invention. The data processing system 20 is controlled primarily by computer readable instructions, which can be in the form of software, wherever, or by whatever means such software is stored or accessed. Such software may be executed within the central processing unit (CPU) 50 to cause data processing system 20 to do work.

Memory devices coupled to system bus 5 include random access memory (RAM) 56, read only memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 3, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 5 and another parallel communication device, such as a printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 3. Those skilled in the art will appreciate that a data processing system constructed in accordance with the present invention may have multiple components selected from the foregoing, including even multiple processors.

Figure 4:
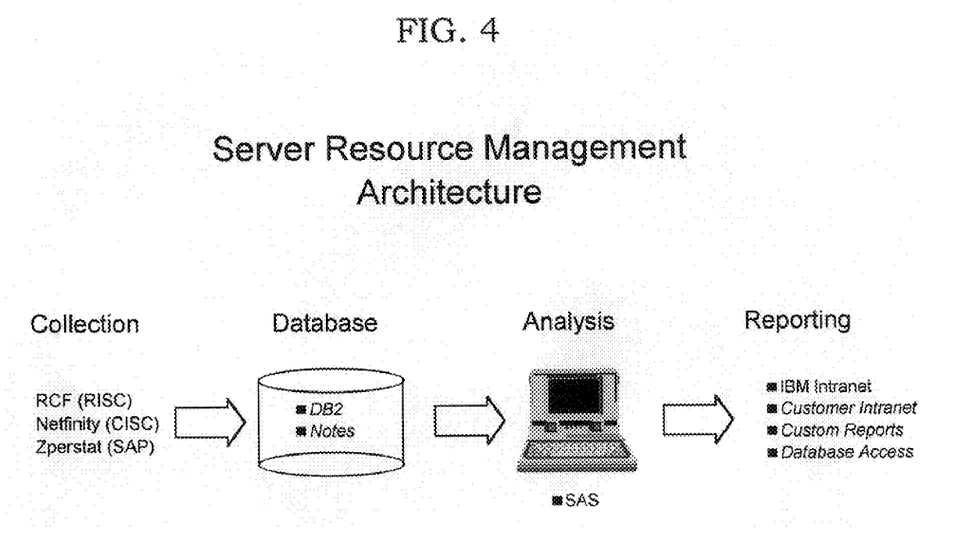
FIG. 4 is a conceptual illustration of the data collection, analysis and reporting as used in accordance with the present invention to manage the performance and capacity of a computer network.

Referring now to FIG. 4, one implementation of the present invention allows data processing system 20 to act in a manner similar to a client, in order to collect server resource information (110), and then analyze (112) and present (114) this information to an end user. In this server resource management (SRM) architecture, data collection (110) is accomplished using a program referred to as a remote command facility (RCF) which works by executing UNIX commands to gather utilization data from one or more servers; the commands are relatively low cost (in terms of resource usage). The only requirement for a managed server is that it have available a scripting language that can run the RCF process. One such scripting language is known as PERL (practical extraction and report language). This tool, which is limited to UNIX-type environments, is used to issue the commands which gather the bulk of the data. Other collection techniques could be used to get the resource information, including alternative scripting languages such as K-shell (the base scripting language available with nearly all UNIX versions).

The RCF process can use the low-impact "sockets" interface, and be extensible for executing data gathering commands on other brands of UNIX. Resource impact on the servers is minor. In trials of this SRM implementation, very few data collection misses occurred. RCF collects key server resource data including current CPU utilization, memory availability, I/O usage, and permanent storage (disk) capacity. An output file is generated (116), containing the collected information. The file can be stored locally at data processing system 20 (on hard disk drive 72), or stored at a remote location, e.g., an internet server (preferably not one of the servers being monitored).

When applied to the Internet, or similar networks, the present invention can provide a user interface for data collection by using conventional communications software (a web browser) which is adapted to display a page having commands or tool bars used to manage data collection. Other communications software can be used besides standard web browsers. For example, SAP 4.1 has a web-enabled interface for all management data. The displayed RCF icons can optionally initiate Java programs ("applets") that issue the RCF to selected servers. In fact, the RCF could itself be a Java program that remotely gathers operating system statistics through the use of Java language subclasses, executing as an architecture-independent applet running on a real browser, a "virtual" browser, or an applet interface. These subclasses could be extended to give utilization and response metrics that include packet errors, response times of SAP transactions, CPU busy ratios, etc. A universal agent could then be designed for collecting performance data on any type of node, freeing the system designer from being forced to use a multitude of different commands, tools and daemons running on each node. The Java URL class could be used to implement the above; a web manager could request the agent to produce a URL with relevant data which would then be processed for analysis.

If a server does not run a UNIX-type platform, other commands can be used to collect the data. For example, resource data for an OS/2 server can be collected using the IBM Netfinity product. For the SAP business management system, a new application programming interface (API) can be constructed. The API can be written in the ABAP language used by SAP. An appropriate API may be constructed by modifying SAP's RSSTAT20 command, to write special "SAP Single Records," or SR's, to a file. RSSTAT20 is part of the much-used STAT transaction. This new modified API, referred to herein as ZPERSTAT, runs as a SAP batch job on each application server. SR's are created for every end-user's interaction with a SAP screen. SR's not only identify the timestamp, userid, SAP program and screen number, but also contain performance/utilization statistics on the various components of response time such as wait for dispatch, database request time, CPU used, etc. Because the number of SR's for each SAP application server is large (currently 6–12 megabytes, probably 100 megabytes in the future), ZPERSTAT may evolve to perform data processing and analysis on itself (or at least some part thereof) reducing the disk and networking requirements. Since ZPERSTAT is a modification of RSSTAT20, it provides a stable interface.

In the foregoing manner, key performance and capacity data from a wide variety of servers becomes web-accessible. Data collection using the RCF is straightforward, automated, and easily scaled. Data collection from different servers can occur at different times, i.e., there is no need for data processing system 20 to be continuously connected to each of the servers.

Once the data has been collected, it can be deposited into an appropriate database (116), and perhaps merged with other historical data previously collected. The collected data can then be forwarded (e.g., via FTP) to a node running an analysis program, such as the Statistical Analysis System (SAS). This software provides a programming language used to analyze data processing. While other statistical algorithms could be used to perform the analysis (even a Java applet), SAS provides powerful parsing of disparate data sources/formats, and intrinsic time arithmetic and summarizing capabilities. Threshold exception logic can be applied at this stage for different server platforms. For example, SAS processing of SAP data offers new ways for an administrator or IT supervisor to view the performance data. Key transactions can be grouped together and averaged to show how well they are running. A service group can also be aggregated from "trivial" SAP transactions such as logging into the main menu. This group is quite helpful for determining how the "system" is running, and has repeatedly proved its use in determining system versus network problems. SAS processing may be replaced by using SAP's business metric and statistical applications.

The analyzed data can be presented in a variety of media or formats. In one implementation, a web browser can again be used to view the analysis, by creating an HTML file which is then placed on the network (e.g., the World Wide Web) in such a manner as to be accessible and usable by the end-user. The presentation technology can exploit conventional web browsers by using color-coding thresholds for platform resource utilization via the intuitive green/yellow/red color scheme. This scheme is understandable to the non-technical user and the very busy executive. The URL can also have a search on node capability, and use red/yellow alerts on exception reports.

Figure 5:
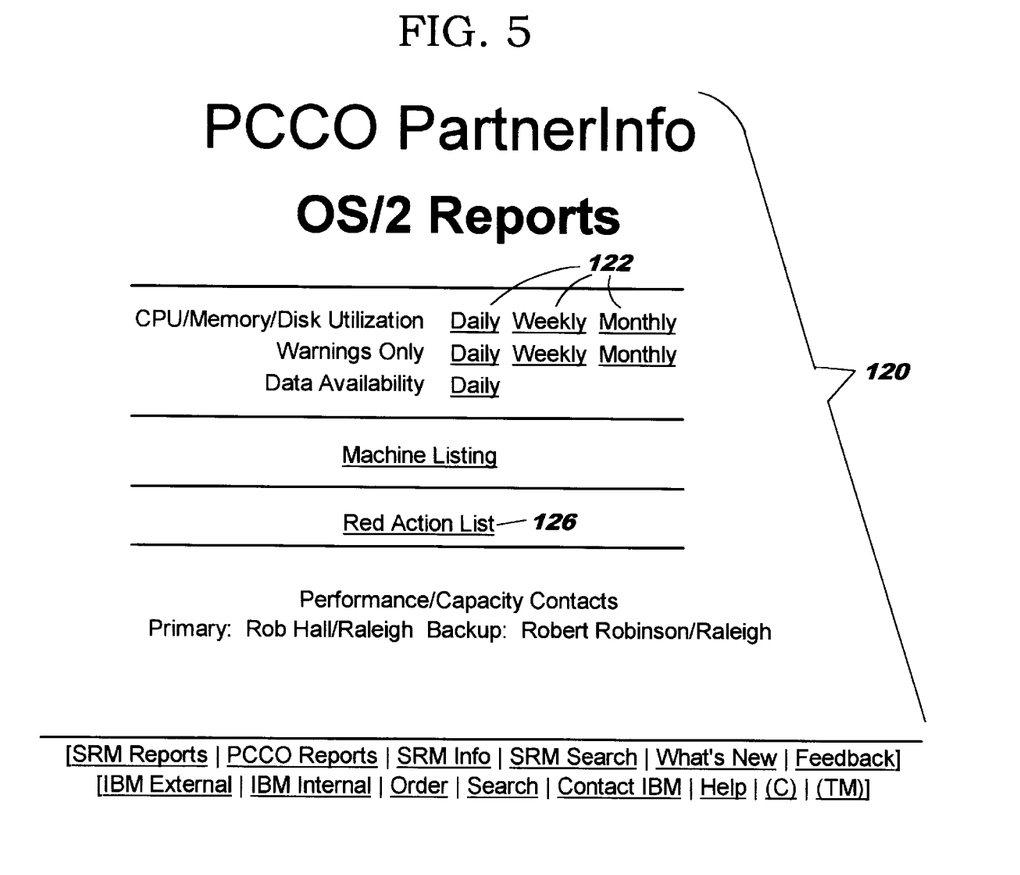
FIG. 5 is an illustration of a browser page having links to performance analysis as provided by the present invention.
Figure 6A:
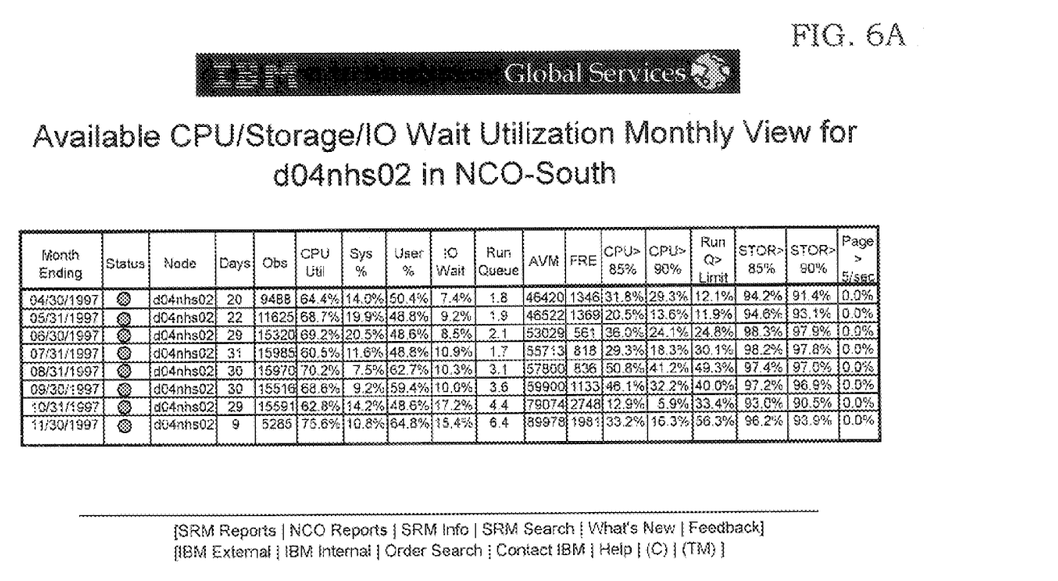
FIGS. 6A–6B are illustration of a browser page showing the performance parameters for various server resources in accordance with the present invention.
Figure 6B:
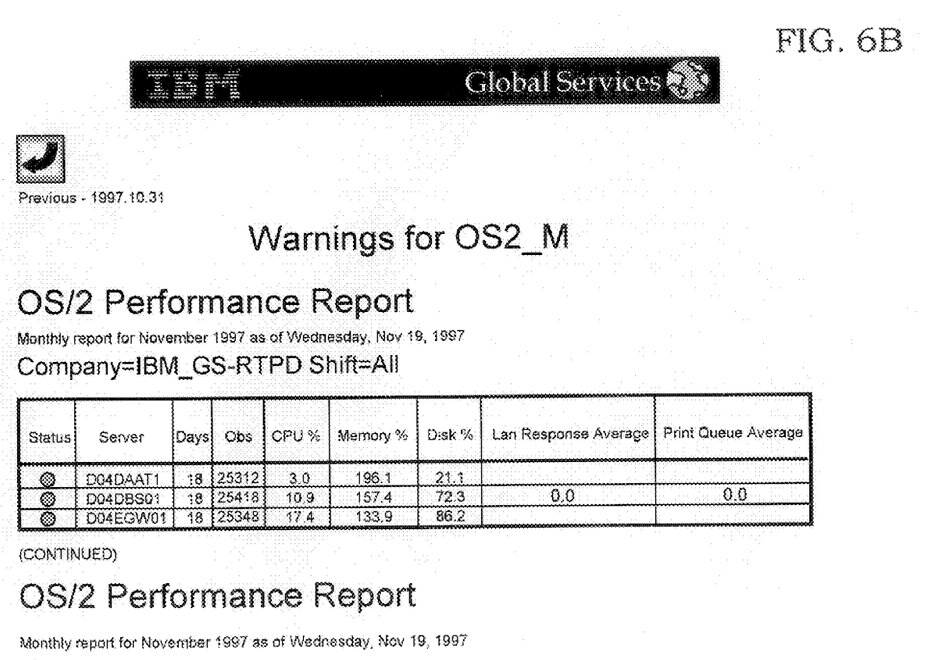

An exemplary web page constructed in accordance with the present invention is shown in FIG. 5. Page 120 includes a plurality of links 122 which may be selected by the user to retrieve additional pages detailing performance statistics (daily, weekly, or monthly) for various server resources. A further page 124 shown in FIG. 6 is an AIX example of such a detailed page. Page 124 depicts performance trends for one server over several days. Statistical parameters shown include: the number of observations; CPU utilization; system usage percentage; user usage percentage; percentage of time I/O wait is greater than 40%; run queue length; active virtual memory (AVM); free space (FRE); percentage of time CPU utilization is greater than 85%; percentage of time CPU utilization is greater than 90%; percentage of time run queue is greater than 5; percentage of time storage usage is greater than 85%; percentage of time storage usage is greater than 90%; and percentage of time paging rate is greater than 5 pages per second. FIG. 6B demonstrates an OS/2 example of page 124 showing the multiple server view. Statistical parameters shown include: server's overall status, i.e., red, yellow or green; server name; total daily samples this month; total minute samples this month; CPU utilization; memory utilization (can exceed 100% if paging occurs demonstrating additional demand for memory); disk utilization; LAN response time; and print queue backlog. Links 122 may have the aforementioned green/yellow/red color-coding to indicate severity of problems.

Figure 7:
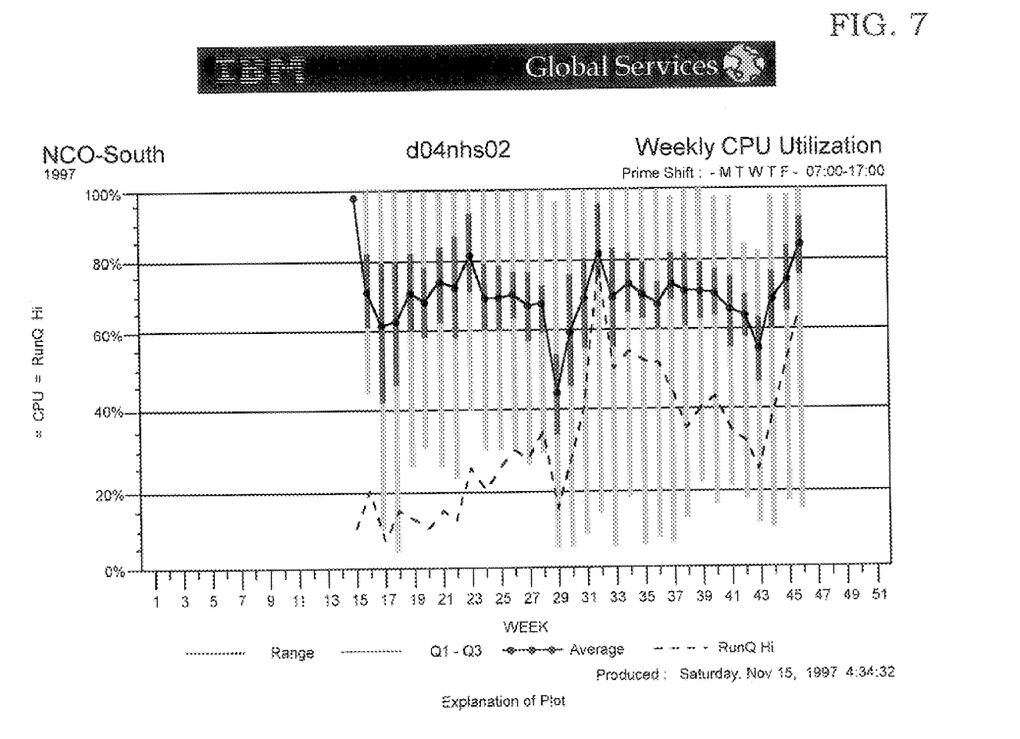
FIG. 7 is an illustration of a browser page having a graph constructed in accordance with the present invention which is used to display weekly CPU utilization data for a specific server.

Links may be provided to view additional, detailed information regarding, for example, a specific resource on a particular server. SRM can present this information in graphical form, as shown in FIG. 7, which is an illustration of a browser page having a graph of weekly CPU utilization data for a server named "d04nhs02." This graph provides CPU utilization data over a period of several months, with individual data points for each week.

Figure 8:
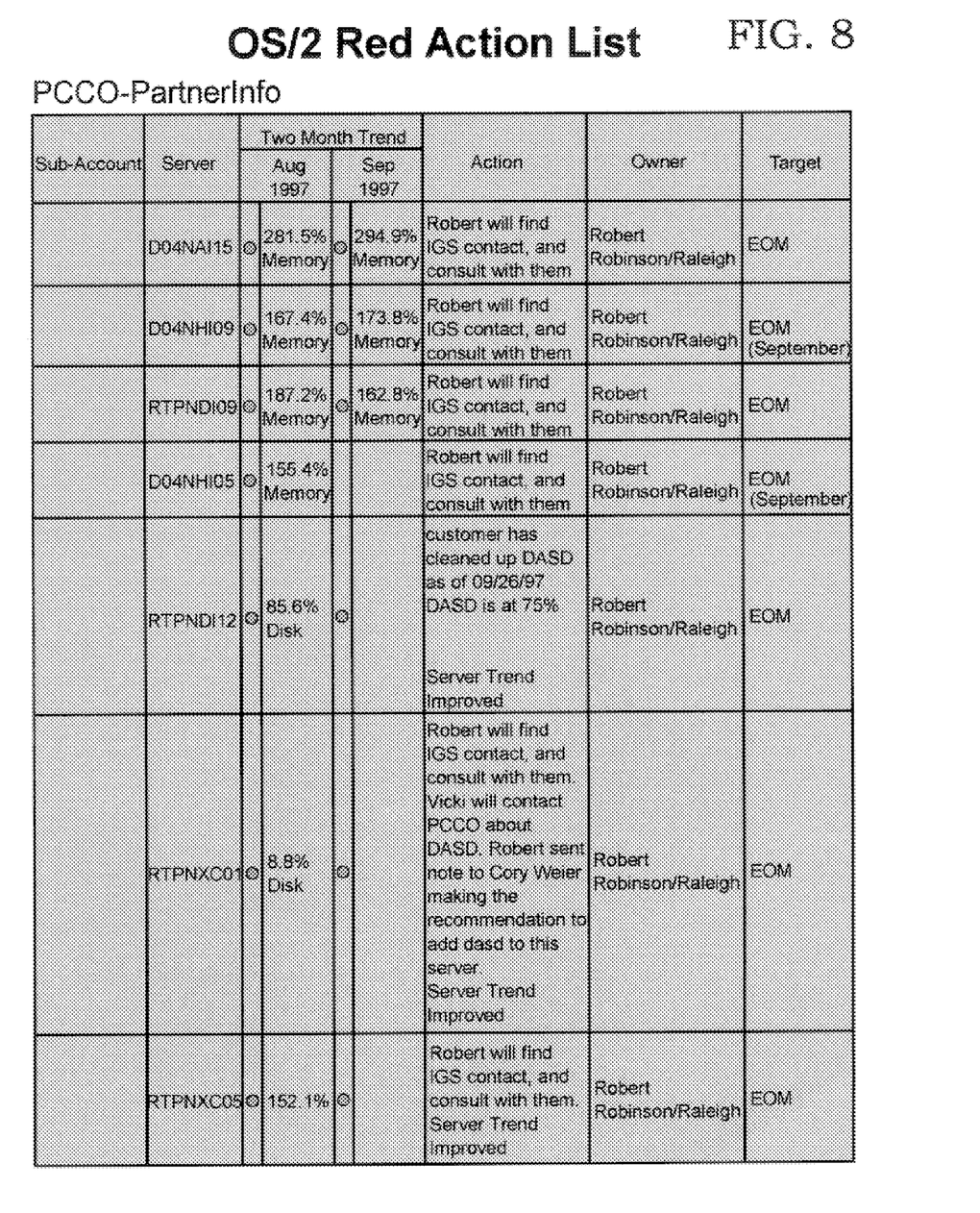
FIG. 8 is an illustration of a browser page listing important action items to be addressed which is constructed in response to certain performance parameters meeting threshold requirements.

FIG. 5 also shows a link 126 to a "Red Action List." Such a list is shown in the browser page 128 of FIG. 8. The SRM system can be used to generate all of the information shown, except for the actions to be taken and the target date. Even default (generic) actions can be assigned, with default target dates selected at some predetermined time period from the trend or occurrence. Thresholds for each account can be based on user requirements, or general industry rules of thumb. For example, the OS/2 memory threshold is exceeded at 150% of installed memory, because that is when OS/2 memory problems start. Another example is when the number of tasks queued to run (RUNQ) on an AIX machine exceeds an average of five tasks. Thresholds can be established for various parameters such as CPU, memory and DASD utilization, swap file size, RUNQ, and I/O activity. A monthly review can take place for all red action lists. Servers can have correct components upgraded, saving money over a complete server upgrade (reports allow the user to identify which components need upgrading).

When new equipment and upgrades are requested, the current status of that equipment can be checked to validate that it is in need of the upgrade. Servers identified by SRM as having low utilization become candidates for consolidation and possible removal. Finally, when program changes are made (such as SAP programming), the effects on the response time can be checked by reviewing the response time numbers for a particular transaction. The present invention thus generally allows system administrators and IT executives to better leverage their IT resources and business management systems. This methodology is easily scaled to handle thousands of servers, and can divide the server information into sub-accounts for use with large numbers of servers.

Figure 9:
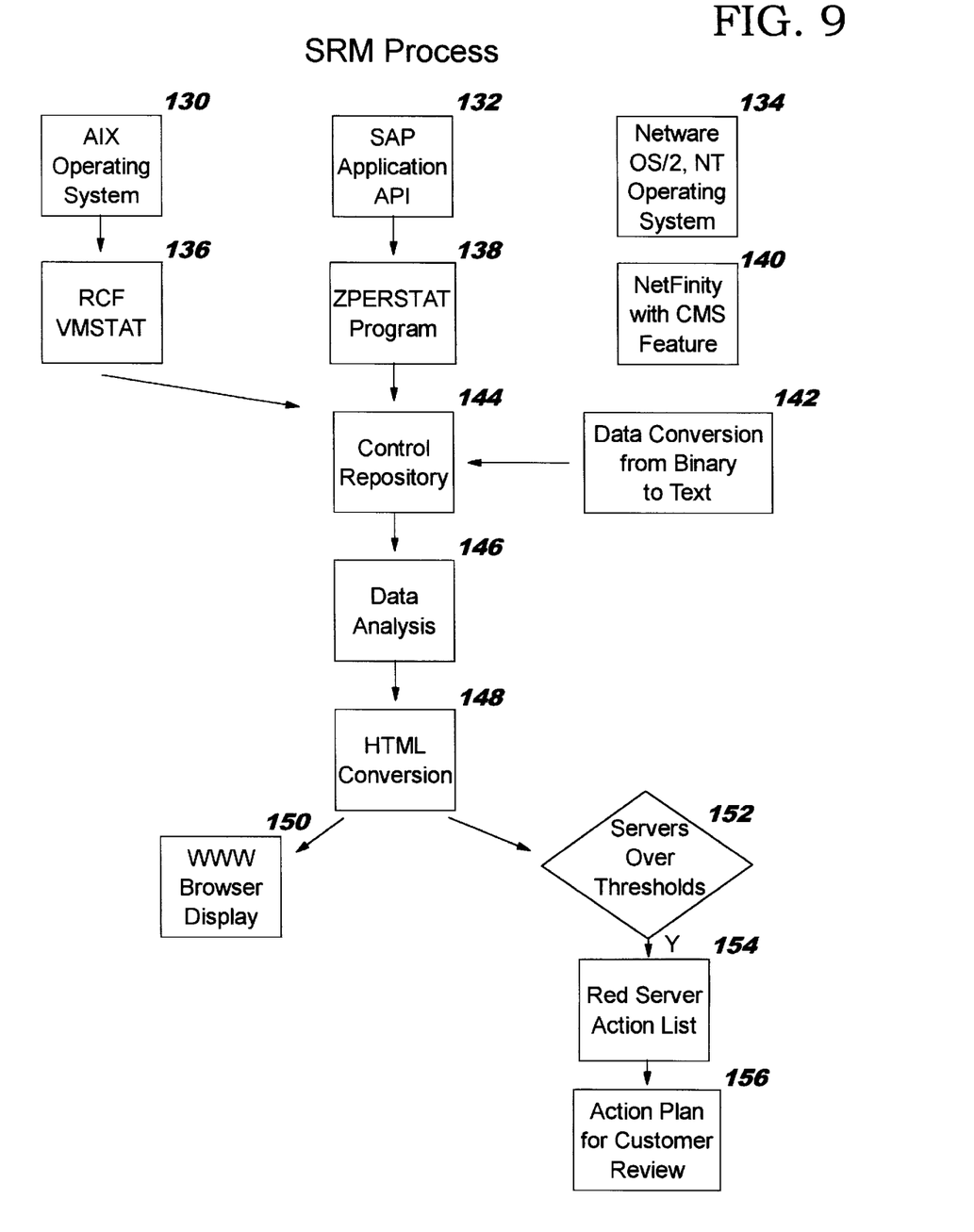
FIG. 9 is a chart depicting the overall flow according to one implementation of the present invention.

The foregoing exemplary description of the invention can be summarized in the chart of FIG. 9. The first step is the operation of three different servers, i.e., initialization of the servers on a common network, wherein the servers are respectively running on the AIX, SAP and OS/2 platforms (130, 132, 134). The SRM process begins with data collection from each server. A program that runs under an AIX userid is used to query the AIX server (136). This program generates standard AIX performance commands, and logs the results for later data collection. The ZPERSTAT program takes advantage of an SAP API to gather the SAP performance data, and logs the results for later data collection (138). The NetFinity software, with the CMS feature installed, generates the data for CISC based platforms such as OS/2, Windows NT, and NetWare (140). The binary log can be converted to text (142), and added to the central repository (144).

In order to multitask the activity each night, several mid-level managers are used to collect the data for their respective systems. This includes additional code to pass through a network firewall, when needed. The data is transferred to a shared file system on a VM system when the mid-level managers are complete. The data is then analyzed by the VM system (using SAS), and reduced from minute observations to daily, weekly, and monthly summaries (146). A REXX program converts the SAS output to HTML format (148) for viewing on the internet (150). In addition, if there are servers which exceed the thresholds for that account (152), a red server action list is generated by SRM (154). This action plan is completed by the support personnel, and reviewed with the customer (156).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of monitoring resource performance in a heterogeneous client-server computer network, comprising the steps of:
    collecting resource data from a plurality of network servers for a plurality of performance parameters wherein the plurality of network servers operate on a plurality of platforms;
    reporting the collected resource data for each server to a network client in response to a request query from the client;
    analyzing the collected resource data to generate performance data for each server; and
    displaying the performance data for the plurality of network servers at the network client.

2. The method of claim 1 wherein:
    the collecting step includes the step of gathering resource data for each server using separate application programs having different application programming interfaces for the respective platforms.

3. The method of claim 1 further comprising the steps of:
    storing the resource performance data into a database; and
    merging the resource performance data with previously collected data.

4. The method of claim 1 wherein the analyzing step includes the act of generating daily, weekly, and monthly performance data.

5. The method of claim 1 wherein the collecting step includes the act of gathering resource performance data pertaining to a plurality of resources including CPU utilization, memory availability, I/O usage, and permanent storage capacity.

6. The method of claim 1 wherein the reporting step includes the act of constructing a report using a plurality of documents related by hypertext links.

7. The method of claim 6, wherein the reporting step further includes the act of color coding at least one of the hypertext links in response to at least one performance parameter in the historical performance data exceeding an associated threshold.

8. The method of claim 1 wherein the collecting step includes the act of:
    gathering resource data at a data processing system from at least one network server while the data processing system is connected to the at least one network server but is disconnected from a remainder of the plurality of network servers.

9. The method of claim 1 wherein the collecting step includes the act of forwarding the resource performance data to the client.

10. The method of claim 1 wherein the reporting step includes the act of creating an action list in response to at least one performance parameter in the historical performance data exceeding an associated threshold.

11. A computer program product for use on a client in a heterogeneous client-server computer network to monitor resource performance, comprising:
    a computer readable storage medium; and
    program instructions stored on said storage medium for (i) collecting resource data from a plurality of network servers connected to the client, said network servers operating on a plurality of platforms, (ii) reporting the collected resource data for each server to the client in response to a request query from the client, (iii) analyzing the resource data for each server to generate performance data, and (iv) displaying the performance data at the client.

12. The computer program product of claim 11 wherein:
    said program instructions are adapted to gather the resource performance data using separate application programs having different application programming interfaces for the respective platforms.

13. The computer program product of claim 11 wherein said program instructions include instructions for storing resource performance data into a database of the computer and merging the resource performance data with previously collected data.

14. The computer program produce of claim 11 wherein said program instructions include for generating daily, weekly, and monthly performance data.

15. The computer program product of claim 11 wherein said program instructions include instructions for gathering resource performance data pertaining to a plurality of resources including CPU utilization, memory availability, I/O usage, and permanent storage capacity.

16. The computer program product of claim 11 wherein said program instructions include instructions for constructing a report using a plurality of documents related by hypertext links and containing the historical performance data.

17. The computer program product of claim 11 wherein said program instructions include instructions for creating an action list in response to at least one performance parameter in the historical performance data exceeding an associated threshold.

18. The computer program product of claim 11 wherein said program instructions include instructions for color coding at least one of the hypertext links in response to at least one performance parameter in the historical performance data exceeding an associated threshold.

19. A system for monitoring resource performance in a heterogeneous client-server computer network, comprising:
    a collection component that collects resource data from a plurality of network servers for a plurality of performance parameters, the network servers operating on a plurality of platforms with each platform using a separate program with a different application programming interface;

a report component that reports the collected resource data for each server to a network client in response to a request query from the client;

an analysis component that analyzes the collected resource data to generate performance data for each server; and a display that displays the performance data for the plurality of network servers at the network client and visually identifies performance parameters that exceed a corresponding threshold value.

20. The system for monitoring resource performance in a heterogeneous client-server computer network of claim 19 further comprising:

a storage medium that stores the resource performance data into a database; and a merge component that merges the resource performance data with previously collected resource performance data.

* * * * *